United States Patent [19]

Hutchisson et al.

[11] Patent Number: 5,132,665
[45] Date of Patent: Jul. 21, 1992

[54] HUB-MOUNTED VEHICLE BACK-UP ALARM

[75] Inventors: James Hutchisson, Bellevue; Robert White, Kent, both of Wash.

[73] Assignee: Dominion Automotive Industries Corp., Florence, Ky.

[21] Appl. No.: 545,512

[22] Filed: Jun. 27, 1990

[51] Int. Cl.$^5$ .................. B60Q 1/22; G08B 21/00
[52] U.S. Cl. .................. 340/463; 340/466; 340/672; 340/670; 340/671; 340/693; 307/9.1; 307/122; 200/61.55; 310/25; 310/40 R; 310/67 A; 310/68 E
[58] Field of Search .................. 340/464-467, 340/672, 686, 687, 669-671, 693; 310/348, 1, 25, 39, 40 R, DIG. 3, 67 A, 68 E; 307/9.1, 10.1, 121-122; 200/61.39, 61.55, 61.57, DIG. 32

[56] References Cited

U.S. PATENT DOCUMENTS

| | | |
|---|---|---|
| 3,214,731 | 10/1965 | Ballard . |
| 3,559,205 | 1/1971 | Colby .................. 340/671 |
| 3,569,927 | 3/1971 | Guytox et al. .................. 340/672 |
| 3,728,676 | 4/1973 | Brown . |
| 3,735,298 | 5/1973 | Colby . |
| 3,753,000 | 8/1973 | Newman . |
| 3,827,024 | 7/1974 | Anderson et al. . |
| 4,103,283 | 7/1978 | Lee . |
| 4,142,152 | 2/1979 | Fincher .................. 340/463 |
| 4,334,428 | 6/1982 | Fima et al. . |
| 4,364,011 | 12/1982 | Bloomfield et al. . |
| 4,514,645 | 4/1985 | Endo et al. . |
| 4,603,317 | 7/1986 | Gailbreath et al. .................. 340/463 |

Primary Examiner—Donnie L. Crosland
Attorney, Agent, or Firm—Christensen, O'Connor, Johnson & Kindness

[57] ABSTRACT

A self-powered back-up alarm for mounting to the wheel hub of a heavy truck or like vehicle. The alarm includes a housing adapted to be mounted to a vehicle wheel hub. Inside the housing is a magnetized stator that is held stable by a counterweight mounted for free rotation to a spindle in the housing. Also mounted in the housing is a power supply including a coil positioned adjacent the stator in the housing and attached thereto so that it rotates about the stator when the wheel hub turns. A battery stores the energy developed across the coil when the wheel hub rotates. Also mounted inside the housing are sensors located adjacent the stator that similarly rotate with the wheel hub. The sensors, in combination with an associated detect circuit, produce a reverse motion signal whenever the vehicle backs up. An audio alarm, located in the housing, is actuated by the reverse motion signal and emits an audible warning whenever the vehicle backs up.

25 Claims, 2 Drawing Sheets 5,132,665

HUB-MOUNTED VEHICLE BACK-UP ALARM

FIELD OF THE INVENTION

This invention relates generally to vehicle motion sensors, and, more particularly, to a self-powered, hub-mounted vehicle back-up alarm.

BACKGROUND OF INVENTION

Back-up alarms are often built into large vehicles such as heavy duty trucks and construction equipment. The alarm monitors vehicle motion, and whenever the vehicle moves in reverse, emits a clearly audible alarm signal. The signal serves as a warning to nearby persons that the vehicle is backing up and that the driver may not be able to see persons standing in the way.

Vehicle back-up alarms generally comprise two subsystems: a motion detect circuit for sensing if the vehicle is moving in reverse; and, an alarm sounding circuit responsive to the detect circuit for emitting an alarm signal when the vehicle is moving in reverse. In some alarms, the detect circuit includes sensors for monitoring the position of the transmission lever, e.g., forward or reverse. Other alarms include sensors for monitoring the motion of some part of the vehicle's drive train, e.g., the drive shaft or a wheel. In either situation, it is necessary to assemble the alarm so that at least some part of the detect circuit is attached to a moving element of the vehicle. This makes installing a back-up alarm a complicated and expensive endeavor. Moreover, should the alarm malfunction, accessing the detect circuit sensing components to determine if they are the source of the problem can be difficult, time consuming and costly.

The alarm sounding circuit in most vehicles is a bell or horn assembly that is typically located in the rear of the vehicle so that the alarm can be heard by persons around that portion of the vehicle. This location is typically spaced some distance from the detect circuit and its sensors. This necessitates having to provide a relatively long conductive link between the detect circuit and the alarm sounding circuit. This link must be appropriately protected, since many vehicles that require back-up alarms are operated in environments where rocks and the like can be thrown up against the vehicle. These objects can quickly cause unprotected wires to break. The need to provide such a protected conductive link further adds to the complexities and costs of providing a back-up alarm.

Moreover, most back-up alarms needed to be attached to a vehicle's electrical system in order to receive the power necessary to activate the components forming the alarm system. Attaching an alarm to a vehicle so that it is connected to the electrical system further adds to the complexities of installing and maintaining the alarm.

SUMMARY OF THE INVENTION

This invention relates to a back-up alarm that is contained in a single unit that is readily adapted for mounting to a vehicle. More particularly, it relates to a self-powered back-up alarm that is contained in a housing adapted for mounting to a vehicle wheel hub.

The back-up alarm of this invention includes a housing adapted for mounting to the outer face of a wheel hub. Inside the housing is a magnetized stator. There is a power supply mounted in the housing for rotation that includes a coil positioned adjacent the stator. Also mounted for rotation inside the housing is an alarm circuit that is energized by the power supply. The alarm circuit includes a pair of sensors that monitor rotation relative to the stator and an audio alarm that is actuated whenever the sensors detect reverse motion.

The back-up alarm of this invention is simply mounted to a rear wheel hub of the vehicle with which it is to be used. As the vehicle moves, the wheel turns and the coil is rotated about the stator. The rotation induces a voltage across the coil, which the power supply stores as energy for activating the alarm circuit. When the vehicle moves backward, the sensors assert signals indicating their "reverse" rotation about the stator. In response to the asserted reverse signals, the audio alarm is actuated and emits a warning sound so that nearby persons will know the vehicle is backing up.

The back-up alarm of this invention is self-powered and contained entirely in its housing so that it is not necessary to connect this alarm to other parts of the vehicle. Further, the entire alarm can simply be pulled off a wheel hub in order to locate the source of any problem. These features serve to minimize both the complexity and cost of attaching the alarm of this invention to a vehicle.

BRIEF DESCRIPTION OF THE DRAWINGS

The invention will be pointed out with particularity in the appended claims. The above and further advantages of the invention may be better understood by reference to the following detailed description taken in conjunction with the accompanying drawings, in which:

FIG. 3 is a diagrammatic representation of the placement of the sensors depicted in FIG. 2; and FIGS. 4a and 4b are timing diagrams representing the phase of the output signals from the sensors depicted in FIG. 3.

DETAILED DESCRIPTION OF THE INVENTION

Figure 1:
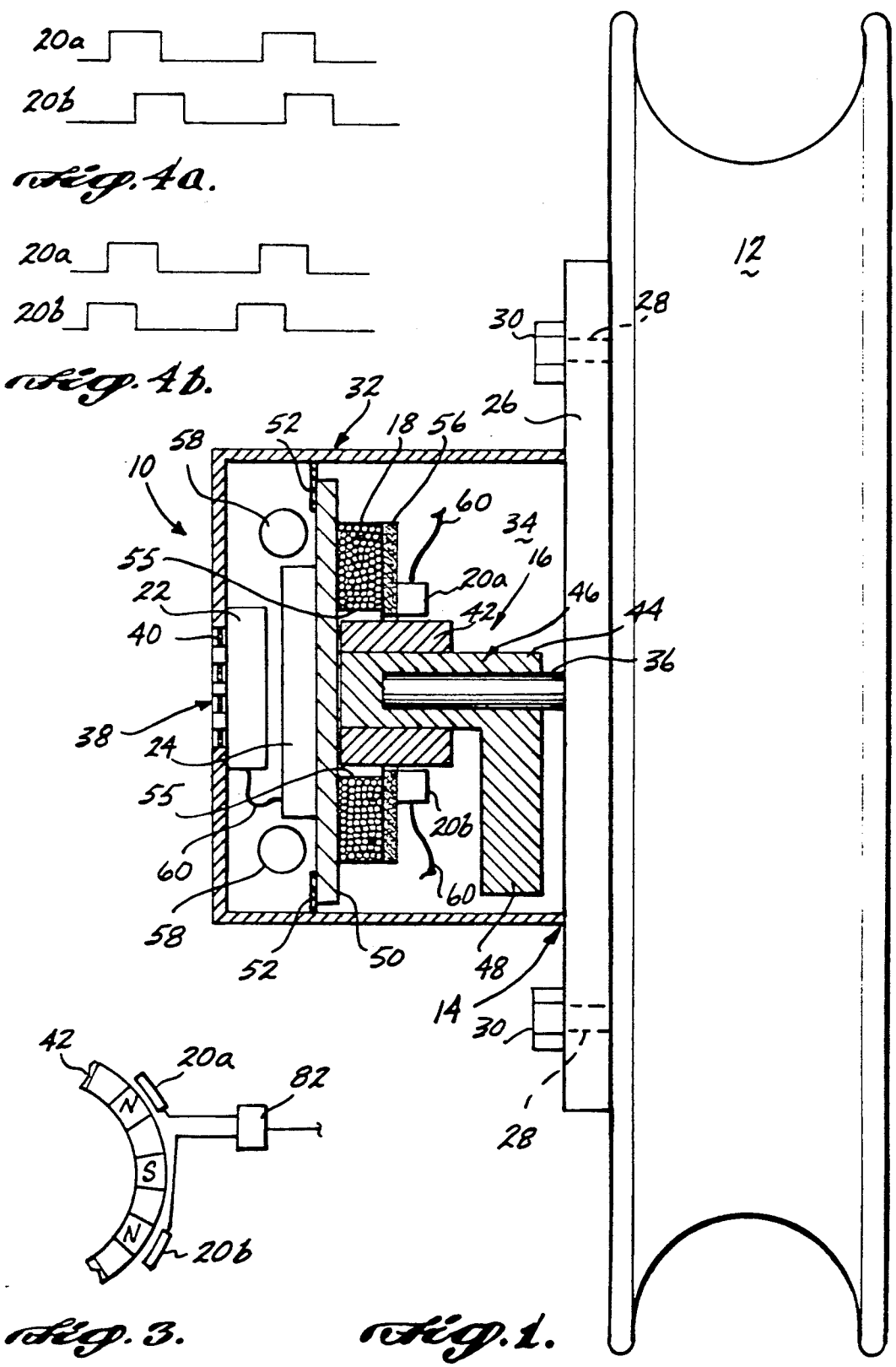
FIG. 1 is a cross-sectional view of the components of the back-up alarm of this invention.

In FIG. 1, the back-up alarm 10 of this invention is depicted in cross section as installed on a wheel hub 12. The back-up alarm 10 includes a housing 14 in which is a magnetized stator 16. A coil 18 is mounted to housing 14 to rotate around the stator 16 when the hub 12 turns in order to produce a voltage for energizing other components of the alarm 10. A pair of Hall effect sensors, 20a and 20b respectively, are mounted in the housing 14 adjacent to stator 16 for producing signals representative of rotation of the housing relative to the stator. A piezoelectric element 22 mounted to the inside surface of the outer face of the housing emits an audible warning signal whenever the sensors 20a and 20b indicate the vehicle is traveling in reverse. A component package 24 inside the housing contains alarm circuit components for storing energy developed by the coil 18 and for controlling the actuation of the piezoelectric element 22 in response to the signals produced by the sensors 20a and 20b.

The housing 14 includes a base plate 26 formed with holes 28 positioned so that housing 14 can be secured to the wheel hub 12 by lug bolts 30. A cylindrically shaped casing 32 attached to the base plate 26 defines an enclosure 34 in which the other components of the back-up alarm 10 are contained. A spindle 36, on which the stator 16 is mounted, extends from the center of the base plate 26 into the enclosure 34. The piezoelectric element 22 is mounted to the inside surface of the casing 32 opposite the spindle 36. The portion of the casing 32 adjacent the piezoelectric element 22 is formed with openings 38 that are filled with a filter material 40 that allows the passage of air and sound but blocks the passage of solid and liquid material.

The stator 16 comprises a magnet 42 attached to a counterweight 44. The counterweight 44 has a tube-shaped coupling section 46, closed at one end, dimensioned to be fitted over the spindle 36. Disposed around the inside wall of the counterweight coupling section 46 are bearings, not illustrated, adjacent the spindle 36 that ensure free movement of the counterweight 44. The magnet 42 is a circular, multi-pole magnet and is attached to the counterweight 44 around the closed end of the coupling section 46.

Integral with the counterweight coupling section 46 and adjacent the base plate 26 is a pendulum 48. The pendulum 48 has sufficient mass so that when the wheel hub 12 rotates, thereby rotating housing 14 and spindle 36, the stator 16 remains stable. For the pendulum 48 to have sufficient mass to stabilize the stator 16, it is anticipated that in some embodiments of the invention, the pendulum will have a pie-shaped appearance when viewed from the front of the alarm 10.

A printed circuit board 50 is attached to the casing 32 adjacent the stator 16. The printed circuit board 50 is reinforced and firmly secured to the casing 32 so that it, and the components mounted thereon, are able to withstand the mechanical vibration and shock to which the wheel hub 12 is exposed. In the depicted embodiment, the printed circuit board 50 is mounted to tabs 52, two shown, that extend into the enclosure 34 from the inside surface of the casing 32. Other mounting assemblies may, of course, be used. The coil 18 is formed of wire 54 wrapped to form a cylindrical shape and is attached to a surface of the printed circuit board 50 facing towards the wheel hub 12 so that coil 18 is disposed around the stator magnet 42. The coil 18 is secured to the printed circuit board 50 by a number of posts 55 that extend out from the printed circuit board.

A dielectric flat O-ring 56 is secured to the top of the posts 55 over the exposed face of the coil 18. The Hall effect sensors 20a and 20b are secured to the O-ring 56 adjacent the outer surface of the stator magnet 42. The component package 24 is mounted to a surface of the printed circuit board 50 facing away from the hub 12. The component package 24 is mounted in the center of the printed circuit board 50 so that when the housing 14 rotates, the stress caused by the centrifugal force will be minimized. Rechargeable batteries 58, for storing the energy developed across the coil 18, are mounted to the printed circuit board 50 adjacent opposed sides of the component package 24. Conductors 60 provide the necessary electrical paths between the coil 18, the Hall effect sensors 20 and 20b and the piezoelectric element 22 to the circuit elements inside the component package 24.

Figure 2:
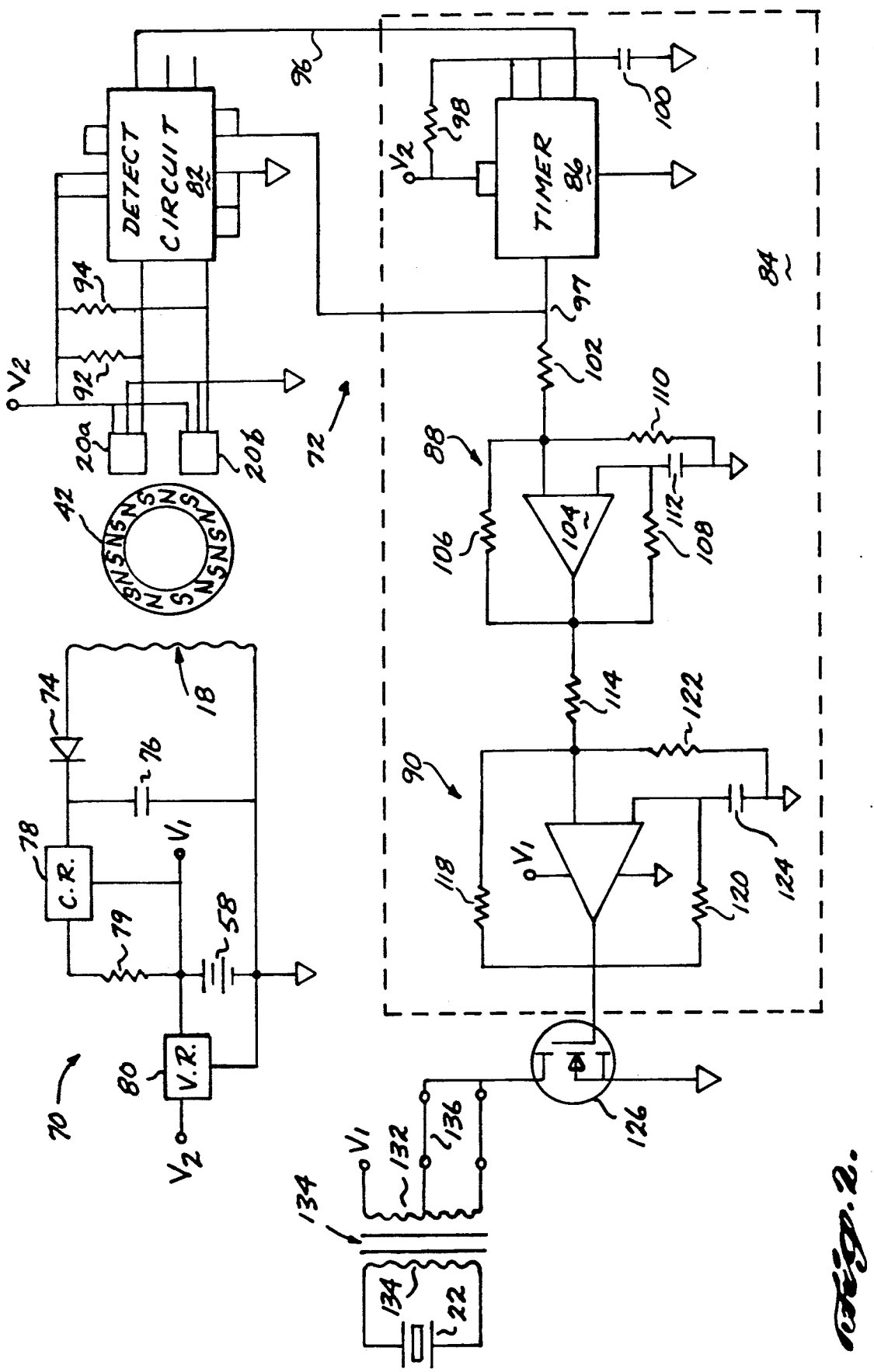
FIG. 2 is a schematic diagram of the circuit components of the back-up alarm of this invention.

FIG. 2 is a schematic diagram of the circuit elements of the back-up alarm 10 of this invention. A power supply 70, shown to the left of stator magnet 42, stores energy developed across the coil 18 and distributes the energy to the other components of the alarm 10. An alarm circuit 72, shown to the right and below stator magnet 42, which includes the Hall effect sensors 20a and 20b and the piezoelectric element 22, produces the audible warning signal whenever the vehicle to which the alarm 10 is attached backs up.

Power supply 70 includes a diode 74 connected in series with the coil 18 and a capacitor 76 connected across the coil and the diode for producing a filtered half-wave rectified voltage from the potential developed across the coil. The rectified voltage is applied to a current regulator 78 to produce a constant current output. In a preferred embodiment of the invention, the current regulator is a 78L15 integrated circuit component that produces a constant 50 millA output signal. The output of the current regulator 78 is applied to the batteries 58 through a resistor 79. The batteries 58 are capable of providing a voltage, $V_1$, that is suitable for actuating the piezoelectric element 22. In a preferred embodiment of the invention, $V_1$ is approximately 9 VDC.

A voltage regulator 80 is connected across the batteries 58. The voltage regulator produces a voltage, $V_2$, suitable for energizing the elements of the alarm circuit 72 requiring a digital logic voltage. In a preferred embodiment of the invention, $V_2$ is 5 VDC, which is the voltage most typically used to drive digital logic components. A suitable voltage regulator 80 for this embodiment of the invention is a 78L05 integrated circuit component.

Alarm circuit 72 includes a detect circuit 82 for monitoring the Hall effect sensors 20a and 20b and producing a reverse motion signal whenever they indicate the vehicle to which the back-up alarm 10 is attached is moving backwards. An alarm actuation circuit 84 responds to the reverse motion signal, selectively actuating the piezoelectric element 22. The alarm actuation circuit 84 includes a timer 86 for controlling the length of time the piezoelectric element is actuated. Alarm actuation circuit 84 also includes first and second oscillators 88 and 90, respectively, that produce a signal to trigger the generation of a particular piezoelectric element 22 drive voltage needed to produce a particular audio signal.

The Hall effect sensors 20a and 20b produce signals representative of the direction of vehicle movement. Each Hall effect sensor, 20a and 20b respectively, is tied across a separate pull-up resistor, 92 and 94 respectively, that are connected to the digital voltage source, $V_2$. The Hall effect sensors 20a and 20b also have a bi-state, open/closed connection to ground. The ground connection state of each Hall effect sensor 20a and 20b depends on the polarity of the adjacent magnetic field. Thus, depending on the polarity of the adjacent section of stator magnet 42, each sensor-resistor sub-circuit produces a particular digital signal.

As shown diagrammatically in FIG. 3, the Hall effect sensors 20a and 20b are connected to the detect circuit 82 so that the relative phase of the individual signals is a function of the vehicle's direction of rotation. FIG. 4a illustrates how, when the vehicle is moving in a first direction, sensor 20a produces a high signal prior to sensor 20b producing the same signal. FIG. 4b illustrates that when the vehicle moves in reverse, the relative phase of the signals is reversed.

The detect circuit 82 (FIG. 2) monitors the signals produced by the Hall effect sensors 20a and 20b and, in response, produces a signal indicative of forward/reverse movement of the vehicle. In a preferred embodiment of the invention, the detect circuit 82 is a flip-flop circuit that, depending on which Hall effect sensor 20a or 20b signal is first produced, produces either a high or low signal over a conductor 96. A suitable integrated circuit that can function as the flip-flop is the 4013BCN. In a preferred embodiment of the invention, the Hall effect sensors 20a and 20b are positioned adjacent stator magnet 42 and connected to detect circuit 82 so that when the vehicle backs up, a reverse motion signal, in the form of a low signal, is produced.

Conductor 96 is connected to the timer 86 which controls the length of time the alarm is actuated. Timer 86, in response to the production of the reverse motion signal, produces an alarm actuate signal for a selected length of time over a conductor 97. In a preferred embodiment of the invention, a 555 timer chip is used as the timer 86. External timing resistor 98 and external timing capacitor 100 are connected to the timer 86 to control the length of time the alarm actuate signal is produced. In a preferred embodiment of the invention, resistor 98 and capacitor 100 are chosen so that each time the reverse motion signal is produced, the alarm actuate signal is produced for 5 seconds.

The alarm actuate signal is supplied to the first oscillator 88 through a load resistor 102. The first oscillator 88 is a relaxation oscillator formed out of an operation amplifier 104. Resistors 106–110 and a capacitor 112, that complete the oscillator circuit, are chosen so that it produces an output signal at approximately 1 Hz.

In the illustrated embodiment of the invention, the alarm actuate signal is also used to control the resetting of the detect circuit 82. A branch of conductor 97 is connected to a reset input of the detect circuit 82. The cancellation of the alarm actuation signal resets the detect circuit 82 so that a new phase comparison of the signals produced by the Hall effect sensors 20a and 20b is performed.

The output signal from the first oscillator 88 is applied through a load resistor 114 to the second oscillator 90. Second oscillator 90 is a relaxation oscillator formed out of an operational amplifier 116. Resistors 118–122 and capacitor 124 that complete the amplifier are chosen so that the output signal is approximately 2200 Hz. The second oscillator 90 is tied between the piezoelectric element drive voltage, $V_1$, and ground so that it produces a square wave signal of sufficient amplitude to trigger the application of a drive voltage to the piezoelectric element 22. Since the signal into the second oscillator is a 1 Hz signal, the output from the oscillators 88 and 90 is a 2200 Hz signal modulated at 1 Hz.

The output signal of the second oscillator 90 is applied to the gate of a power MOSFET 126. The MOSFET 126 is tied between a primary winding 132 of a coupling transformer 130 and ground. The transformer secondary winding 134 is connected across the piezoelectric element 22. One end of the transformer primary winding 132 is connected to receive the piezoelectric element drive voltage $V_1$. The MOSFET 126 is connected to either the opposite end or the center tap of the primary winding by a jumper 136. The selective connection offered by the jumper 136 is used to control the magnitude of the voltage developed across the transformer secondary winding 134 so as to control the amplitude of the signal emitted by the piezoelectric element 22.

Power supply 70 provides the power needed to actuate the various components of the alarm circuit 72 (connections not shown.) The Hall effect sensors 20a and 20b, the detect circuit 82 and the timer 86 are provided with the digital logic voltage, $V_2$. The second oscillator 90 and the transformer primary winding 136 of the transformer 130 are provided with the piezoelectric element drive voltage, $V_1$.

When the back-up alarm 10 of this invention is attached to a vehicle, the normal rotation of the wheel hub 12 causes the coil 18 and the Hall effect sensors 20a and 20b to similarly rotate. Stator magnet 42 is kept stable by the counterweight 44. The rotation of the coil 18 about the stator magnet 42 causes a voltage to develop across the coil. Power supply 70 stores the energy developed across the coil 18 in the batteries 58 so that the energy is available to power the alarm circuit 72 and the piezoelectric element 22.

When the vehicle is operated in reverse, the Hall effect sensors 20a and 20b produce a distinct set of signals representative of this motion. When these signals are produced, the detect circuit 82, in turn, produces the reverse motion signal. Timer 86 responds to the reverse motion signal by producing the alarm actuate signal for a selected amount of time. The alarm actuate signal activates the oscillators 88 and 90 so that the MOSFET 126 is cyclically gated. The gating of the MOSFET 126 induces a voltage across the transformer secondary winding 134 so as to cause the piezoelectric element 22 to produce an audible warning signal. The cancellation of the alarm actuate signal resets the detect circuit 82. If the vehicle is at rest or traveling forward, Hall effect sensors 20a and 20b will not produce signals in "reverse" phase and the emission of the audio warning signal will cease. If the vehicle is still traveling in reverse, the signal produced by Hall effect sensors 20a and 20b will still be in "reverse" phase and the alarm 10 will continue to emit the warning signal.

The back-up alarm 10 of this invention is designed to be readily mounted to the wheel hub 12 of a vehicle such as a truck or piece of construction equipment. It is not necessary to connect any other part of this alarm 10 to the vehicle for purposes of receiving power or for attachment of a motion detect sensor. Thus, this back-up alarm 10 can readily be attached to a vehicle, with a minimal amount of effort or expense.

Moreover, this alarm 10 does not require a protected conductive link between the detect elements and the sound emitting component. This further reduces the complexity and cost of providing and maintaining the back-up alarm 10 of this invention.

The foregoing description has been limited to a specific embodiment of this invention. It will be apparent, however, from the description of the invention, that it can be practiced using alternative components other than what have been specifically described. For example, the disclosed Hall effect sensors 20a and 20b and associated detect circuit 82 for producing a reverse motion signal are understood to be exemplary components and not limiting elements. Similarly, the power supply 70 can clearly be constructed out of components other than those that have been disclosed. Thus, in some embodiments of the invention, it may be desirable to replace the batteries 58 with energy storage capacitors. This might be desirable when power supply 70 is used to activate low-power sensors that only draw a few micro Amps of current.

It is also understood that the disclosed mechanical arrangement of components of this invention similarly are meant to only be illustrative. Thus, in some embodiments of the invention it may be desirable to mount all the electronically actuated components of the invention on a stator and mount the magnet to the housing. In these embodiments of the invention, rotation of the wheel hub 12 would rotate the magnet so as to cause a voltage to develop across the coil and cause the sensors to produce a specific set of signals.

Moreover, it should further be understood that this invention is not limited to a self-powered back-up alarm. The hub-mounted power supply 70 of this invention can clearly be used to power sensors other than those used to detect forward/reverse motion and annunciators other than audio alarms. Alarm circuit 72 can, for example, be replaced with sensors and associated circuitry designed to monitor both speed and direction of wheel rotation. Signals produced by this circuit could then be forwarded to a central processing unit in the vehicle by a low-powered transmitter also located in housing enclosure 34 and activated by power supply 70. By providing all four wheels of a vehicle with this type of speed monitoring and reporting system, a processor would have essentially instantaneous speed information for each wheel that it could then use to control steering and/or braking.

Therefore, it is an object of the appended claims to cover all such modifications and variations as come within the true spirit and scope of the invention.

The embodiments of the invention in which an exclusive property or privilege is claimed are defined as follows:

1. A vehicle sensor assembly including:
   a housing forming an enclosure adapted for being secured to a vehicle wheel hub;
   a power supply in said housing enclosure for generating a supply voltage in response to rotation of the wheel hub; and
   a detector assembly in said housing enclosure powered by said supply voltage including at least one sensor element adapted for monitoring at least one parameter of the wheel hub rotation.

2. The vehicle sensor assembly of claim 1, wherein said detector assembly sensor element monitors forward/reverse motion of the wheel hub rotation.

3. The vehicle sensor of claim 2, wherein said detector assembly produces a reverse motion signal whenever the wheel hub rotates in the reverse direction and further including an alarm circuit in said housing enclosure including an audio alarm, wherein said alarm circuit is connected to receive said reverse motion signal, and in response to receiving said reverse motion signal, actuates said audio alarm.

4. The vehicle sensor assembly of claim 1, wherein said power supply includes a first component mounted to said housing for remaining stationary when the wheel hub rotates and a second component mounted in said housing adjacent said first component and mounted to said housing to rotate with the wheel hub, whereby said first and second components form a generator so that the rotation of said second component adjacent said stationary first component causes said supply voltage to develop across either said first component or said second component.

5. The vehicle sensor assembly of claim 4, wherein said detector assembly monitors the forward/reverse motion of the wheel hub rotation and produces a reverse motion signal whenever the wheel hub rotates in the reverse direction and further including an alarm circuit in said housing enclosure including an audio alarm, wherein said alarm circuit is connected to receive said reverse motion signal, and in response to receiving said reverse motion signal, produces said audio alarm.

6. The vehicle sensor assembly of claim 4, wherein said power supply first component is a magnet adapted to be held stationary and said power supply second component is a coil located adjacent said magnet mounted to said housing to rotate about said magnet with the rotation of the wheel hub.

7. The vehicle sensor assembly of claim 6, wherein said detector assembly sensor element is located in said enclosure adjacent said magnet and is mounted to said housing to rotate with the wheel hub.

8. The vehicle sensor assembly of claim 7, wherein said detector assembly sensor element produces signals representative of forward/reverse motion of the wheel hub rotation and said detector assembly produces a reverse motion signal whenever the wheel hub rotates in the reverse direction.

9. The vehicle sensor of claim 8, further including an alarm circuit in said housing including an audio alarm, wherein said alarm circuit is connected to receive said reverse motion signal, and in response to receiving said reverse motion signal, actuates said audio alarm.

10. The vehicle sensor assembly of claim 7, where in said magnet is attached to a counterweight and said counterweight is mounted for free rotation to said housing.

11. The vehicle sensor assembly of claim 10, wherein said counterweight includes a pendulum.

12. The vehicle sensor assembly of claim 4, wherein said power supply includes a battery for storing energy developed by the wheel hub rotation.

13. The vehicle sensor assembly of claim 1, wherein said power supply is capable of producing voltages at least two distinct supply voltages.

14. A vehicle power supply assembly including:
   a housing forming an enclosure and adapted to be secured to a vehicle wheel hub so as to rotate with the wheel hub;
   a first component mounted in said housing enclosure for remaining stationary when the wheel hub rotates;
   a second component mounted in said housing enclosure adjacent said first component and mounted to said housing to rotate with the wheel hub, whereby said first and second components form a generator so that the rotation of said second component adjacent said stationary first component produces a voltage to develop across either said first component or said second component; and
   a load connected to said component across which said voltage is produced for receiving said voltage.

15. The vehicle power supply assembly of claim 14, wherein said first component is a magnet adapted to be held stationary, said second component is a coil located adjacent said magnet and is mounted to said housing to rotate about said magnet with rotation of the wheel hub and said load is connected across said coil.

16. The vehicle power supply assembly of claim 15, wherein said magnet is attached to a counterweight and said counterweight is mounted for free rotation to said housing.

17. The vehicle power supply assembly of claim 16, wherein said counterweight includes a pendulum.

18. The vehicle power supply assembly of claim 14, further including a battery connected to said first or second component across which said voltage is produced for storing energy developed by the wheel hub rotation.

19. The vehicle power supply assembly of claim 18 further including a rectifier circuit connected between said component across which said voltage is produced, and said battery.

20. The vehicle power supply assembly of claim 14, wherein said power supply is capable of producing voltages of at least two distinct output voltages.

21. The vehicle power supply of claim 14, wherein said load includes a detector assembly mounted in said housing that includes a sensor element for monitoring at least one parameter of the wheel hub rotation.

22. The vehicle power supply of claim 14, wherein said load includes an annunciator circuit.

23. The vehicle power supply of claim 22, wherein said annunciator circuit produces an audio signal.

24. The vehicle power supply of claim 21, wherein said detector assembly produces a signal based on the wheel hub rotation parameter monitored by said sensor element, and said load further includes an annunciator circuit connected to receive said detector assembly and, in response thereto, produces a signal.

25. The vehicle power supply of claim 24, wherein said annunciator circuit produces an audio signal.

* * * * *